(12) United States Patent
Dreps et al.

(10) Patent No.: US 7,888,968 B2
(45) Date of Patent: Feb. 15, 2011

(54) CONFIGURABLE PRE-EMPHASIS DRIVER WITH SELECTIVE CONSTANT AND ADJUSTABLE OUTPUT IMPEDANCE MODES

(75) Inventors: Daniel M. Dreps, Georgetown, TX (US); John C. Schiff, Round Rock, TX (US); Dhaval R. Sejpal, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 45 days.

(21) Appl. No.: 12/354,007

(22) Filed: Jan. 15, 2009

(65) Prior Publication Data

US 2010/0177830 A1 Jul. 15, 2010

(51) Int. Cl.
*H03K 19/094* (2006.01)
*H03K 17/16* (2006.01)
(52) U.S. Cl. .......................... 326/82; 326/30
(58) Field of Classification Search ................ 326/30, 326/82, 83, 87; 327/295; 370/217
See application file for complete search history.

(56) References Cited

U.S. PATENT DOCUMENTS

| | | | |
|---|---|---|---|
| 3,927,280 A | 12/1975 | Gupta et al. | |
| 4,268,723 A | 5/1981 | Taylor | |
| 4,783,643 A | 11/1988 | Dingwall | |
| 5,347,538 A | 9/1994 | Marbot | |
| 5,398,261 A | 3/1995 | Marbot | |
| 5,422,608 A | 6/1995 | Levesque | |
| 5,666,078 A | 9/1997 | Lamhier et al. | |
| 5,726,583 A | 3/1998 | Kaplinsky | |
| 5,739,707 A | 4/1998 | Barraclough | |
| 6,087,847 A | 7/2000 | Mooney et al. | |
| 6,087,848 A | 7/2000 | Lin et al. | |
| 6,127,862 A | 10/2000 | Kawasumi | |
| 6,157,215 A | 12/2000 | Gabara et al. | |

(Continued)

OTHER PUBLICATIONS

USPTO Office action dated Aug. 23, 2006 for U.S. Appl. No. 11/055,834.

(Continued)

*Primary Examiner*—Rexford N Barnie
*Assistant Examiner*—Crystal L Hammond
(74) *Attorney, Agent, or Firm*—Yee & Associates, P.C.; Matthew W. Baca (57) ABSTRACT

Embodiments of the invention are directed to a single driver that can be used to transmit data with configurable levels of pre-emphasis, and can have either a constant or adjustable driver output impendence, selectively. One embodiment, directed to a driver apparatus, is associated with a digital communication channel for transmitting data signals, wherein at least one of the signals includes a higher frequency component. The apparatus comprises a first sub-driver that has a constant output impedance, and is selectively configurable to implement two or more different levels of pre-emphasis. The apparatus further comprises one or more second sub-drivers. A set of connector elements are provided for connecting the first sub-driver and each of the second sub-drivers in parallel relationship with one another, so that the first sub-driver and each of the second sub-drivers all have inputs that respectively receive a specified driver apparatus input signal, and all have outputs that are connected together to selectively provide a specified driver apparatus output impedance. The apparatus further includes a device that is connected to selectively disable and enable each of the second sub-drivers.

20 Claims, 3 Drawing Sheets

U.S. PATENT DOCUMENTS

| | | | |
|---|---|---|---|
| 6,326,821 B1 | 12/2001 | Gabara | |
| 6,545,560 B1 | 4/2003 | Thompson et al. | |
| 6,583,659 B1 * | 6/2003 | Kwong et al. | 327/295 |
| 6,624,662 B1 | 9/2003 | Volk | |
| 6,633,178 B2 * | 10/2003 | Wilcox et al. | 326/30 |
| 6,642,742 B1 | 11/2003 | Loyer | |
| 6,690,744 B2 | 2/2004 | Hedberg | |
| 6,704,818 B1 | 3/2004 | Martin et al. | |
| 6,759,868 B2 | 7/2004 | Helt et al. | |
| 6,794,909 B1 | 9/2004 | Uramaki et al. | |
| 6,803,790 B2 | 10/2004 | Haycock et al. | |
| 6,909,305 B1 | 6/2005 | Li et al. | |
| 6,930,506 B2 | 8/2005 | Cranford, Jr. et al. | |
| 6,980,018 B2 | 12/2005 | Ngo et al. | |
| 7,180,333 B2 | 2/2007 | Tseng | |
| 7,212,035 B2 | 5/2007 | Dreps et al. | |
| 7,215,144 B2 | 5/2007 | Mitby et al. | |
| 7,227,382 B1 | 6/2007 | Talbot et al. | |
| 7,248,636 B2 | 7/2007 | Martinez | |
| 7,362,697 B2 * | 4/2008 | Becker et al. | 370/217 |
| 7,489,159 B2 * | 2/2009 | Kim | 326/30 |
| 7,545,164 B2 * | 6/2009 | Song et al. | 326/30 |
| 7,671,630 B2 * | 3/2010 | Howe et al. | 326/82 |

OTHER PUBLICATIONS

USPTO Notice of allowance dated Dec. 27, 2006 for U.S. Appl. No. 11/055,834.

USPTO office action dated Jun. 14, 2004 for U.S. Appl. No. 10/065,475.

USPTO Notice of allownace dated Apr. 22, 2005 for U.S. Appl. No. 10/065,475.

* cited by examiner

FIG. 1

| | MODE BIT SETTING | PRE-EMPHASIS | | | SUB-DRIVER ENABLE SIGNALS | | | | | DRIVER OUTPUT IMPEDANCE |
|---|---|---|---|---|---|---|---|---|---|---|
| | 202 | 204 | | | 206 | | | | | 208 |
| | | P3 | P2 | P1 | En_5 | En_4 | En_3 | En_2 | En_1 | |
| (1) | 0 | 0 | 0 | 0 | 0 | 0 | 0 | 0 | 0 | 50 OHMS |
| (2) | 0 | 0 | 0 | 1 | 0 | 0 | 0 | 0 | 1 | 50 OHMS / 25 OHMS |
| (3) | 0 | 0 | 1 | 0 | 0 | 0 | 0 | 1 | 1 | 50 OHMS / 16.67 OHMS |
| (4) | 0 | 0 | 1 | 1 | 0 | 0 | 1 | 1 | 1 | 50 OHMS / 12.5 OHMS |
| (5) | 0 | 1 | 0 | 0 | 0 | 1 | 1 | 1 | 1 | 50 OHMS / 10.0 OHMS |
| (6) | 0 | 1 | 0 | 1 | 1 | 1 | 1 | 1 | 1 | 50 OHMS / 8.33 OHMS |
| (7) | 1 | Sp_1, Sp_2, Sp_3 | | | 0 | 0 | 0 | 0 | 0 | 50 OHMS WITH PRE-EMPHASIS AS PER SETTING |

CONFIGURABLE PRE-EMPHASIS DRIVER WITH SELECTIVE CONSTANT AND ADJUSTABLE OUTPUT IMPEDANCE MODES

BACKGROUND OF THE INVENTION

1. Field of the Invention

The invention disclosed and claimed herein generally pertains to a driver apparatus for transmitting data signals through a digital I/O communication channel, wherein higher frequency signal components experience substantially more attenuation then lower frequency components. More particularly, the invention pertains to apparatus of the above type wherein pre-emphasis is used in transmitting a signal, so that the energy levels of the higher frequency components are increased as the signal travels through the channel. Even more particularly, the invention pertains to an apparatus of the above type wherein the amount of pre-emphasis is determined by the output impedance of the driver, and such impedance can be either constant or adjustable, selectively, and the driver can implement different levels of pre-emphasis.

2. Description of the Related Art

Typically, I/O communication channels, such as are used for off-chip communications and have a driver and a receiver, exhibit a frequency response similar to that of low pass filters. As a result of this, the higher frequency components of a transmitted data signal tend to experience larger amounts of attenuation than the lower frequency components. This degrades the transition times of the transmitted signal, and in extreme cases leads to errors in the data communication.

Pre-emphasis is a means of mitigating the signal degradation caused by the limited bandwidth of the channel. During pre-emphasis, a transmitted signal is pre-conditioned such that the relative energies of the transmitted signal after traversing the channel are back in line with those of the original signal, thus equalizing the frequency characteristic of the channel. Since the frequency response of a channel changes with different channels and conditions, a driver must be able to implement different levels of pre-emphasis, so that it can be used to transmit data over a range of channel conditions.

U.S. Pat. No. 7,212,035, to Dreps et al., describes an I/O driver that can be configured to provide the requisite different levels of pre-emphasis. This is achieved by adjusting the driver output impedance based on the data pattern being transmitted. The changing output impedance results in a change in the output voltage, which in turn results in higher frequency energy content in the transmitted signal. This capability also indirectly enables the driver to be used for applications requiring data to be transmitted over longer channel lines that are extremely lossy, wherein a high signal voltage swing is required to move the data through the channel.

In some situations, signal reflections caused by the mismatch between driver output impedance and channel impedance are of small enough concern that the resulting signal degradation can be tolerated. However, in other situations pertaining to higher speed communication links, such reflections are not generally permissible, and require both impedance matching and configurable pre-emphasis. As used herein, configurable pre-emphasis refers to the ability to adjust or set a driver to provide the desired level of pre-emphasis. U.S. Pat. No. 6,930,506, to Cranford, Jr. et al, describes a driver that can be configured to implement different levels of pre-emphasis, while maintaining a constant output impedance. Accordingly, the Cranford disclosure could be used to meet the above communication link requirements, where impedance mismatch is a problem. A drawback of the solution described by Cranford, Jr. et al, however, is the limited range of output impedances that is achievable by the Cranford driver. For example, it would not be practical to use the driver of Cranford in the same range of output impedances that can be achieved by the driver of Dreps et al. This limited range of output impedances indirectly limits the voltage swing of the transmitted signal.

BRIEF SUMMARY OF THE INVENTION

Embodiments of the invention are directed to a single driver that can be used to transmit data with configurable levels of pre-emphasis, and can have either a constant or adjustable driver output impedance, selectively. One embodiment, directed to a driver apparatus, is associated with a digital communication channel for transmitting data signals wherein at least one of the signals includes both higher and lower frequency components. The apparatus comprises a first sub-driver that has a constant output impedance, and is selectively configurable to implement two or more different levels of pre-emphasis. The apparatus further comprises one or more second sub-drivers. A set of connector elements are provided for connecting the first sub-driver and each of the second sub-drivers in parallel relationship with one another, so that the first sub-driver and each of the second sub-drivers all have inputs that respectively receive a specified driver apparatus input signal, and all have outputs that are connected together to selectively provide a specified driver apparatus output impedance. The apparatus further includes a device that is connected to selectively enable and disable each of the second sub-drivers.

DETAILED DESCRIPTION OF THE INVENTION

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
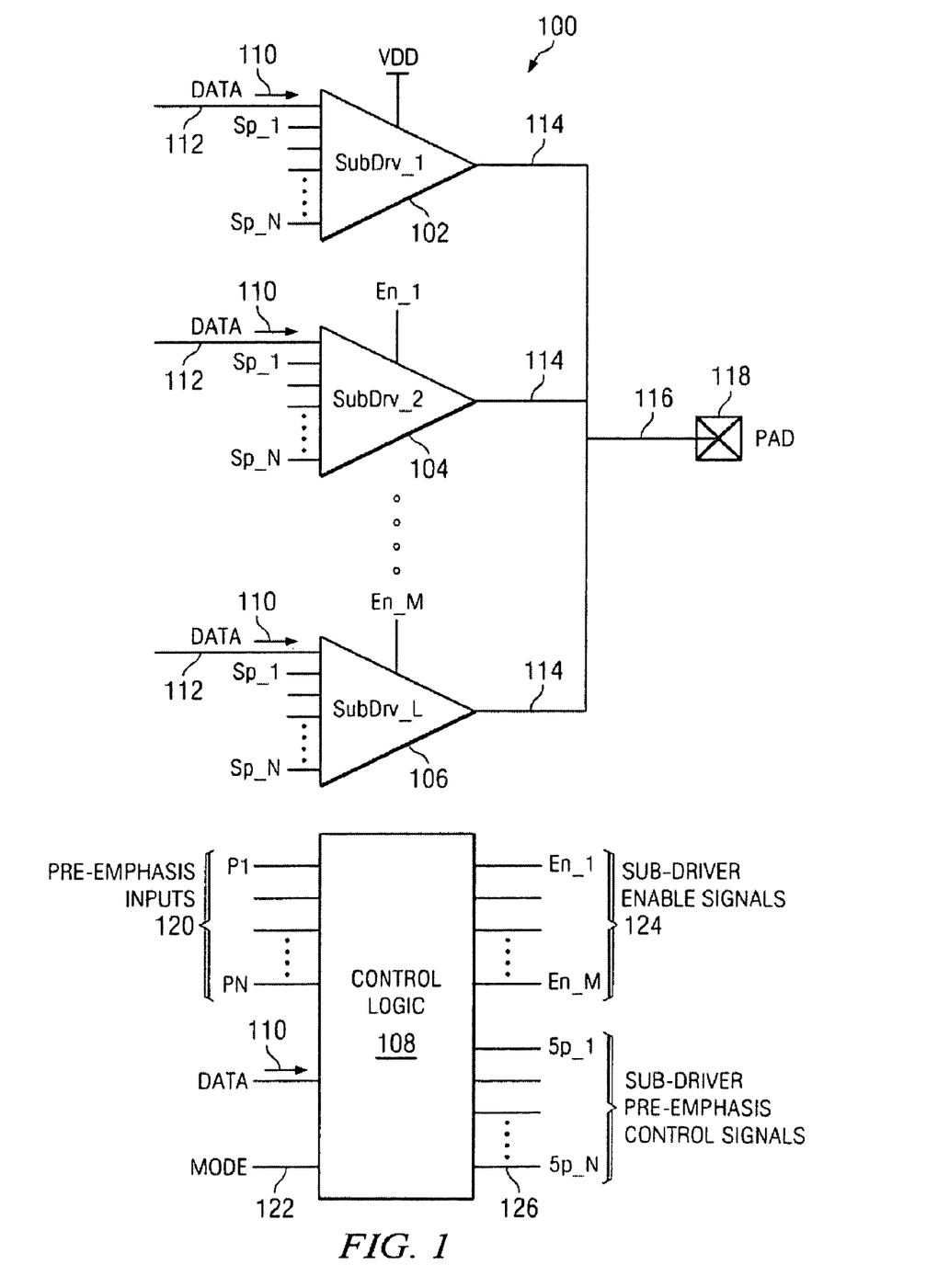
FIG. 1 is a block diagram showing an embodiment of the invention.

Referring to FIG. 1, there is shown a single driver 100 that comprises an embodiment of the invention. Driver 100 includes two or more sub-drivers arrayed in a parallel relationship with one another, such as sub-drivers 102, 104, and 106. Driver 100 further includes a control logic component 108. At least one of the sub-drivers, such as sub-driver 102, is configured to implement different levels of pre-emphasis while maintaining a constant output impedance. In a useful embodiment, all the other sub-drivers also have this capability. As described hereinafter in further detail, each of the sub-drivers except sub-driver 102 can be selectively enabled or disabled. Sub-driver 102 is always enabled, when data is being transmitted. For illustrative purposes only, and without limiting the invention, each of the sub-drivers 102-106 has an output impedance of 50 ohms.

By connecting all of the sub-drivers 102-106 in parallel, each sub-driver receives the same data signal input 110, via an input connector element 112. Also, all of the sub-driver outputs are connected together, via respective sub-driver output connector elements 114, to a single driver output 116. Thus, the output impedance of driver 100, at a particular time, is derived collectively from the output impedance of sub-driver 102, and the output impedance of each of the other sub-drivers that are respectively enabled at that particular time.

FIG. 1 further shows the output 116 of driver 100 connected to a path or terminal 118, such as the input terminal of a chip or integrated circuit (IC). Driver 100 may thus be used to transmit data signals to ICs or the like. As described hereinafter in further detail, the output impedance provided by driver 100 can be selectively adjusted or configured, in order to adjust the pre-emphasis that is provided to compensate for attenuation of high-frequency components of transmitted data signals.

Referring further to FIG. 1, there is shown control logic component 108 receiving the data input signal 110. Component 108 also receives a set of pre-emphasis inputs 120, comprising a set of bits P1-PN, and a mode select signal 122. By receiving the data signal 110, the control component 108 is provided with the pattern of the driver input signal, that is, the particular sequence of successive digital 1's and 0's that comprise the signal.

The mode select signal 122 will have either a first or a second value. When the mode select signal has a first value (e.g. "1"), the driver 100 must be configured to implement different levels of pre-emphasis, and at the same time must maintain a constant output impendence. Accordingly, when the mode select signal of the first value is received, control logic component 108 disables all of the sub-drivers of driver 100 except sub-driver 102. Sub-driver 102 is then operated alone, to maintain a constant driver impedance while implementing different levels of pre-emphasis, as needed.

When the mode select signal has a second value (e.g. "0"), driver 100 must provide a required level or levels of pre-emphasis, and operates as a variable output impedance driver. To accomplish this, the inputs P1-PN of the set 120 indicate an amount or level of pre-emphasis that is needed at a particular time. The control logic component 108 decodes this pre-emphasis level from the inputs P1-PN, and determines the number of sub-drivers needed to provide the required pre-emphasis. Then, depending on the data pattern of the driver input signal, respective sub-drivers are successively enabled or disabled. This causes continual change of the parallel combination of sub-driver output impedances, and thus results in a variable driver output impedance. The variable output impedances, in turn, implement varying levels of pre-emphasis, based on the data input pattern.

FIG. 1 further shows control logic component 108 providing a set of M driver enable signals 124, comprising En_1-En_M. M is the number of sub-drivers contained in driver 100, such as sub-drivers 104 and 106, which are in addition to sub-driver 102. Each of the driver enable signals is coupled to a different one of the sub-drivers, such as En_1 coupled to sub-driver 104 and En_M coupled to sub-driver 106. In response to particular input signals 110, 120 and 122, control logic component 108 generates a set of driver enable signals En_1-En_M, and sends them to enable or disable respective sub-drivers, as described above. Sub-driver 102, which always remains enabled when data is being transmitted, is continually coupled to a source VDD.

Referring further to FIG. 1, there is shown control logic component 108 providing a set 126 comprising N sub-driver pre-emphasis control signals Sp_1-Sp_N. The number of pre-emphasis control signals is thus equal to the number of pre-emphasis inputs P1-PN. Control signals Sp_1-Sp-N are derived by control logic component 108 from the pre-emphasis inputs P1-PN, and indicate the level of pre-emphasis that is to be implemented by driver 100. FIG. 1 shows each of the sub-drivers 102-106 adapted to receive the signals Sp_1-Sp-N, for reasons described hereinafter.

Figure 2:
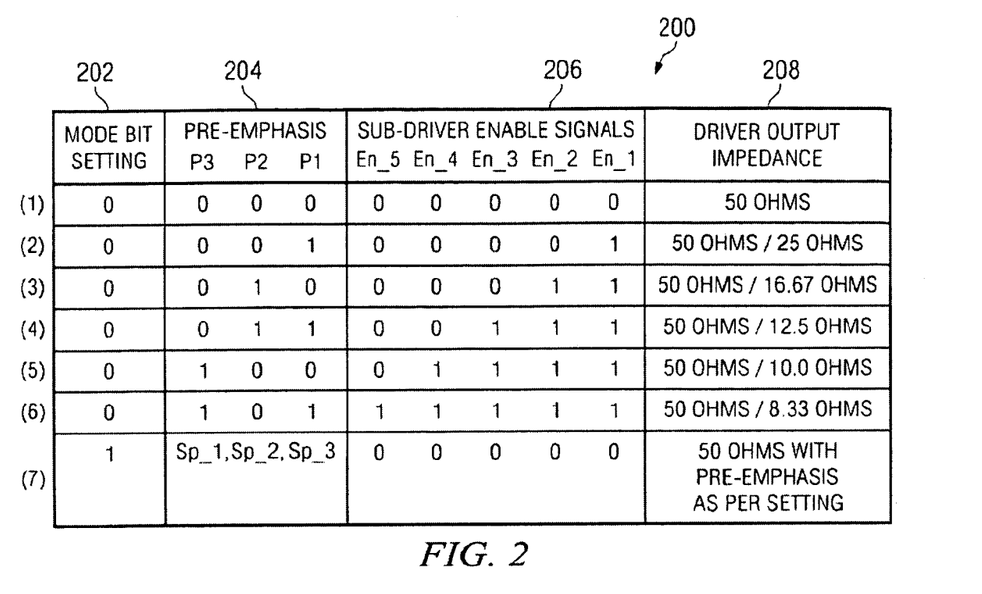
FIG. 2 is a table containing information associated with the embodiment of FIG. 1.

Referring to FIG. 2, there is shown a table 200 of exemplary data that may be used with driver 100 in FIG. 1. The data of table 200 is also useful for illustrating the operation of driver 100. Column 202, labeled Mode Bit Setting, contains the mode select signal 122. Column 204 contains a set of pre-emphasis input bits P1-PN, where N is equal to 3. Column 206 contains sub-driver enable signals En_1-En_M, where M is equal to 5, and column 208 discloses the output impendence of driver 100 for respective settings of rows (1)-(7) of table 200.

At row (1) of table 200, the mode select signal is "0", indicating that driver 100 must provide a specified level of pre-emphasis, and must operate in a variable output impedance mode. However, the pre-emphasis input of "000" for row (1) indicates further that no sub-driver other than sub-driver 102 in FIG. 1 is needed to implement the specified level of pre-emphasis. Thus, enable signals En_1-En_5, for each of the sub-drivers in addition to sub-driver 102, are respectively set to "0" in order to disable each of these sub-drivers. Accordingly, the driver output impedance for these settings, as shown in column 208 for row (1), is 50 ohms. This is the output impedance of sub-driver 102 acting by itself.

Referring further to FIG. 2, the mode select signal of row (2) is again "0". In row (2), however, the pre-emphasis input of column 204 indicates that one sub-driver in addition to sub-driver 102 must be used, in order to implement the specified level of pre-emphasis. Accordingly, the enable signals enable the sub-driver associated with En_1, which is shown in FIG. 1 to be sub-driver 104.

If sub-drivers 102 and 104 each have an output impedance of 50 ohms, the output impedance of the parallel combination thereof would be 25 ohms. This is shown at column 208 of row (2).

The mode select signal is "0" for each of the row (3)-(6) of table 200. The pre-emphasis inputs for these rows indicate that the number of sub-drivers in addition to sub-driver 102 that must be used, in order to implement the specified level of pre-emphasis for respective rows (3)-(6), is two additional sub-drivers for row (3); three additional sub-drivers for row (4); four additional sub-drivers for row (5); and five additional sub-drivers for row (6).

Referring further to FIG. 2, it is to be understood that for the settings of row (3), driver 100 will have a total of three sub-drivers connected in parallel, that is, sub-driver 102 and two additional sub-drivers. If each of these sub-drivers has an output impedance of 50 ohms, the total output impedance of driver 100 will be 16.67 ohms, as shown by column 208 of FIG. 2.

Similarly, for the setting of rows (4)-(6), with respective parallel combinations of four, five, and six sub-drivers, the output impedance of driver 100 will be 12.5 ohms; 10.0 ohms; and 8.33 ohms, respectively.

In row (7) of FIG. 2, the mode select signal 122 is set to "1". As described above, for this setting all of the sub-drivers except sub-driver 102 must be disabled. Accordingly, each of the enable signals En_1-En_5 is set to zero, as shown by row (7) at column 206. The driver output impedance for this setting is a constant value of 50 ohms, which is the output impedance of sub-driver 102.

As likewise described above, driver 100 must be able to implement varying levels of pre-emphasis for the mode setting of row (7). Sub-driver 102 therefore receives the pre-emphasis control signals Sp_1-Sp_3, as shown by row (7) at column 204, which indicate the different level of pre-emphasis that sub-driver 102 is to provide. Sub-driver 102 is constructed so that it can be configured to provide the desired levels of pre-emphasis as indicated thereby.

The sub-driver pre-emphasis controls Sp_1-Sp_3 are also set, when the mode select is "0" as shown by rows (1)-(6), so that the sub-driver 102 will act only in connection with other enabled sub-drivers in providing pre-emphasis, and will not implement a variable pre-emphasis on its own. Moreover, FIG. 1 shows each of the other sub-drivers of driver 100 adapted to receive the pre-emphasis control signals. This is done to illustrate that in an embodiment of the invention, efficiency may be enhanced by using sub-drivers that are identical to one another, as building blocks, in constructing the full driver 100.

Figure 3:
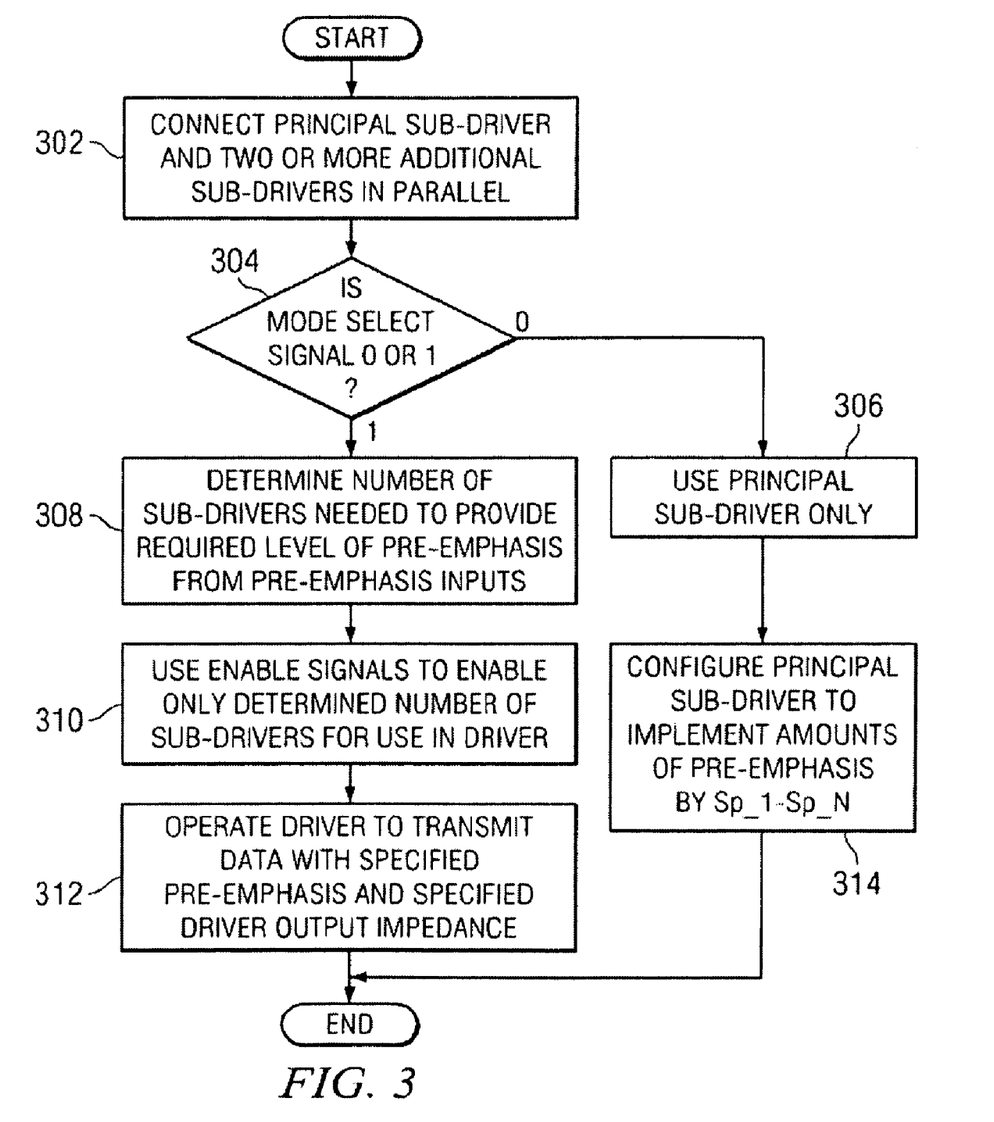
FIG. 3 is a flowchart showing steps of a method comprising an embodiment of the invention.

Referring to FIG. 3, there are shown steps for a method comprising an embodiment of the invention, for transmitting data signals. At step 302, a principal sub-driver such as sub-driver 102 in FIG. 1, and one or more additional sub-drivers, are connected together in parallel to construct a driver in accordance with principles of the invention. Thus, each sub-driver receives the same driver input signal, which may comprise the data signal to be transmitted. Also, the outputs of the sub-drivers that are enabled collectively determine or provide the driver output impedance, as described above.

Step 304 is a querying or determining step, to determine whether the mode select signal has a first or a second value such as "0" or "1". FIG. 2 shows that if the mode select signal is "0", the method proceeds to step 306. This step indicates that only the principal sub-driver is to be used, in order to provide a specified pre-emphasis. Therefore, only the principal sub-driver is enabled, and operated as described above to transmit the data signal with constant output impedance. As shown at step 314, the principal sub-driver is configured to implement amounts of pre-emphasis that are specified or determined by the pre-emphasis controls Sp_1-Sp_N.

If the mode select signal is 1, step 308 is implemented, to determine the number of sub-drivers that are needed to provide a required level of pre-emphasis. This number, which is determined from the pre-emphasis inputs, can be any number from one to the total number of sub-drivers that are contained in the driver.

At step 310, the determined number of sub-drivers are enabled. Then, the driver is operated at step 312 to transmit signal data with the specified pre-emphasis and driver output impedance. Thereafter, the method ends.

Figure 4:
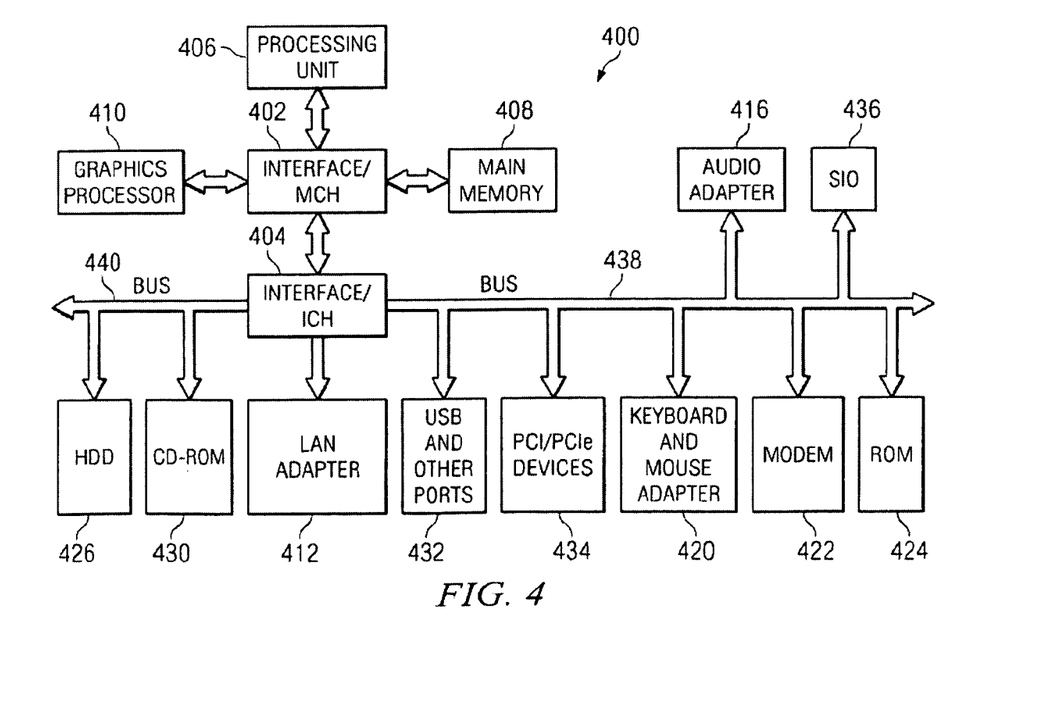
FIG. 4 is a block diagram showing a computer or data processing system which can be used in an embodiment of the invention.

Referring to FIG. 4, a block diagram of a data processing system 400 is shown in which aspects of the present invention may be implemented. System 400 may be used, for example, in association with or as the control logic component 108 in FIG. 1. Data processing system 400 is an example of a computer in which computer usable code or instructions implementing the processes for embodiments of the present invention may be located.

In the depicted example, data processing system 400 employs a hub architecture including north bridge and memory controller hub (NB/MCH) 402 and south bridge and input/output (I/O) controller hub (SB/ICH) 404. Processing unit 406, main memory 408, and graphics processor 410 are connected to NB/MCH 402. Graphics processor 410 may be connected to NB/MCH 402 through an accelerated graphics port (AGP).

In the depicted example, local area network (LAN) adapter 412 connects to SB/ICH 404. Audio adapter 416, keyboard and mouse adapter 420, modem 422, read only memory (ROM) 424, hard disk drive (HDD) 426, CD-ROM drive 430, universal serial bus (USB) ports and other communication ports 432, and PCI/PCIe devices 434 connect to SB/ICH 404 through bus 438 and bus 440. PCI/PCIe devices may include, for example, Ethernet adapters, add-in cards, and PC cards for notebook computers. PCI uses a card bus controller, while PCIe does not. ROM 424 may be, for example, a flash binary input/output system (BIOS).

HDD 426 and CD-ROM drive 430 connect to SB/ICH 404 through bus 440. HDD 426 and CD-ROM drive 430 may use, for example, an integrated drive electronics (IDE) or serial advanced technology attachment (SATA) interface. Super I/O (SIO) device 436 may be connected to SB/ICH 404.

An operating system runs on processing unit 406 and coordinates and provides control of various components within data processing system 400 in FIG. 4. As a client, the operating system may be a commercially available operating system, such as Microsoft® Windows® XP (Microsoft and Windows are trademarks of Microsoft Corporation in the United States, other countries, or both). An object-oriented programming system, such as the Java™ programming system, may run in conjunction with the operating system and provide calls to the operating system from Java™ programs or applications executing on data processing system 400 (Java is a trademark of Sun Microsystems, Inc. in the United States, other countries, or both).

As a server, data processing system 400 may be, for example, an IBM® eServer™ System p computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 400 may be a symmetric multiprocessor (SMP) system including a plurality of processors in processing unit 406. Alternatively, a single processor system may be employed.

Instructions for the operating system, the object-oriented programming system, and applications or programs are located on storage devices, such as HDD 426, and may be loaded into main memory 408 for execution by processing unit 406. The processes for embodiments of the present invention are performed by processing unit 406 using computer usable program code, which may be located in a memory, such as, for example, main memory 408, ROM 424, or in one or more peripheral devices 426 and 430.

Those of ordinary skill in the art will appreciate that the hardware in FIG. 4 may vary depending on the implementation. Other internal hardware or peripheral devices, such as flash memory, equivalent non-volatile memory, or optical disk drives and the like, may be used in addition to or in place of the hardware depicted in FIG. 4. Also, the processes of the present invention may be applied to a multiprocessor data processing system. In some illustrative examples, data processing system 400 may be a personal digital assistant (PDA), which is configured with flash memory to provide non-volatile memory for storing operating system files and/or user-generated data.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In association with a digital communication channel for transmitting data signals, driver apparatus comprising:
    a first sub-driver that has a constant output impedance, and is selectively configurable to implement two or more different levels of pre-emphasis;
    one or more second sub-drivers;
    a set of connector elements for connecting the first sub-driver and the one or more second sub-drivers in parallel relationship with one another, so that the first sub-driver and the second sub-drivers all have inputs that respectively receive a specified driver apparatus input signal, and all have outputs that are connected together to selectively provide a specified driver apparatus output impedance; and
    a device connected to selectively enable or disable each of the second sub-drivers, wherein a different driver enable signal is coupled to each of the second sub-drivers.

2. The apparatus of claim 1, wherein:
    said apparatus includes a control device responsive to a mode select signal for configuring said driver apparatus to implement a specified driver apparatus output impedance that is constant or is variable, selectively, during transmission of the data signal by said driver apparatus.

3. The apparatus of claim 1, wherein:
    said apparatus includes a control device responsive to a pre-emphasis input signal, for configuring said driver apparatus to implement one or more levels of pre-emphasis for transmission of the data signal.

4. The apparatus of claim 1, wherein the first sub-driver remains continually enabled.

5. The apparatus of claim 1, wherein the specified driver apparatus input signal comprises one or more of said data signals.

6. The apparatus of claim 1, wherein the specified driver apparatus output impedance is derived collectively from the output impedances of said first sub-driver and said selectively enabled second sub-drivers.

7. The apparatus of claim 1, wherein each of the first and second sub-drivers has a constant output impedance.

8. The apparatus of claim 7, wherein each of the second sub-drivers is configurable to implement two or more different levels of pre-emphasis.

9. The apparatus of claim 1, wherein the apparatus comprises at least two of the second sub-drivers.

10. The apparatus of claim 1, wherein the driver apparatus has an output that is connected to an input terminal of an integrated circuit (IC).

11. In association with a driver and digital communication channel for transmitting data signals, a method comprising the steps of:
    connecting a first sub-driver that has a constant output impedance, and is selectively configurable to implement two or more different levels of pre-emphasis, in parallel with each of one or more second sub-drivers, so that inputs of the first sub-driver and the second sub-drivers all respectively receive a specified driver input signal, and all have outputs that are connected together to selectively provide a specified driver output impedance; and
    selectively enabling or disabling respective second sub-driver, wherein a different driver enable signal is coupled to each of the second sub-drivers.

12. The method of claim 11, wherein responsive to a mode select signal, a specified driver output impedance is implemented that is constant or variable, selectively, during transmission of the data signal.

13. The method of claim 11, wherein responsive to a pre-emphasis input signal, one or more levels of pre-emphasis are implemented for transmission of the data signal.

14. The method of claim 11, wherein the first sub-driver remains continually enabled.

15. The method of claim 11, wherein the specified driver output impedance is derived collectively from the output impedances of said first sub-driver and said selectively enabled second sub-drivers.

16. In association with a driver and digital communication channel for transmitting data signals, a computer program product executable in a computer readable medium comprising:
    instructions for connecting a first sub-driver that has a constant output impedance, and is selectively configurable to implement two or more different levels of pre-emphasis, in parallel with each of one or more second sub-drivers, so that inputs of the first sub-driver and the second sub-drivers all respectively receive a specified driver input signal, and all have outputs that are connected together to selectively provide a specified driver output impedance; and instructions for selectively enabling or disabling respective second sub-drivers, wherein a different driver enable signal is coupled to each of the second sub-drivers.

17. The computer program product of claim 16, wherein:

responsive to a mode select signal, a specified driver output impedance is implemented that is constant or variable, selectively, during transmission of the data signal.

18. The computer program product of claim 16, wherein responsive to a pre-emphasis input signal, one or more levels of pre-emphasis are implemented for transmission of the data signal.

19. The computer program product of claim 16, wherein the first sub-driver remains continually enabled.

20. The computer program product of claim 16, wherein the specified driver apparatus output impedance is derived collectively from the output impedance of said first sub-driver and said selectively enabled second sub-driver.

* * * * *